(12) United States Patent
Mamiya

(10) Patent No.: US 11,138,051 B2
(45) Date of Patent: Oct. 5, 2021

(54) INFORMATION PROCESSING APPARATUS AND METHOD OF TRANSFERRING DATA

(71) Applicant: CANON KABUSHIKI KAISHA, Tokyo (JP)

(72) Inventor: Haruko Mamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 16/148,054

(22) Filed: Oct. 1, 2018

(65) Prior Publication Data

US 2019/0108075 A1  Apr. 11, 2019

(30) Foreign Application Priority Data

Oct. 5, 2017  (JP) .............................. JP2017-195378

(51) Int. Cl.
*H04N 3/28* (2006.01)
*G06F 9/54* (2006.01)
*G06F 21/44* (2013.01)

(52) U.S. Cl.
CPC .............. *G06F 9/543* (2013.01); *G06F 21/44* (2013.01)

(58) Field of Classification Search
CPC .................. G06F 9/543; G06F 21/44
See application file for complete search history.

(56) References Cited

U.S. PATENT DOCUMENTS

| 9,769,339 | B2 | 9/2017 | Ono | |
|---|---|---|---|---|
| 2010/0325235 | A1* | 12/2010 | Konno | A63F 13/34 709/214 |
| 2014/0082747 | A1* | 3/2014 | Negoro | G06F 21/608 726/28 |
| 2015/0227101 | A1* | 8/2015 | Uchida | G03G 15/553 399/24 |
| 2016/0150105 | A1* | 5/2016 | Shinomiya | H04N 1/00307 358/1.15 |
| 2016/0366293 | A1 | 12/2016 | Ono | |
| 2017/0139658 | A1* | 5/2017 | Nagata | G06F 3/147 |

FOREIGN PATENT DOCUMENTS

JP  2017005475 A  1/2017

\* cited by examiner

*Primary Examiner* — Doon Y Chow
*Assistant Examiner* — Abdou K Seye
(74) *Attorney, Agent, or Firm* — Venable LLP

(57) ABSTRACT

According to the claimed invention, an information processing apparatus comprises an application unit in which at least one application is installed; and a data unit configured to store application data corresponding to the at least one application, wherein the application unit and the data unit can be connected to or separated from each other, the data unit determines, when connected to the application unit, whether the connected application unit is linked to the data unit, and in a case in which the application unit is not linked to the data unit, the data unit obtains the application data from a second data unit linked to the connected application unit, stores the obtained application data, and causes the connected application unit to store information to link the data unit connected to the application unit.

10 Claims, 15 Drawing Sheets

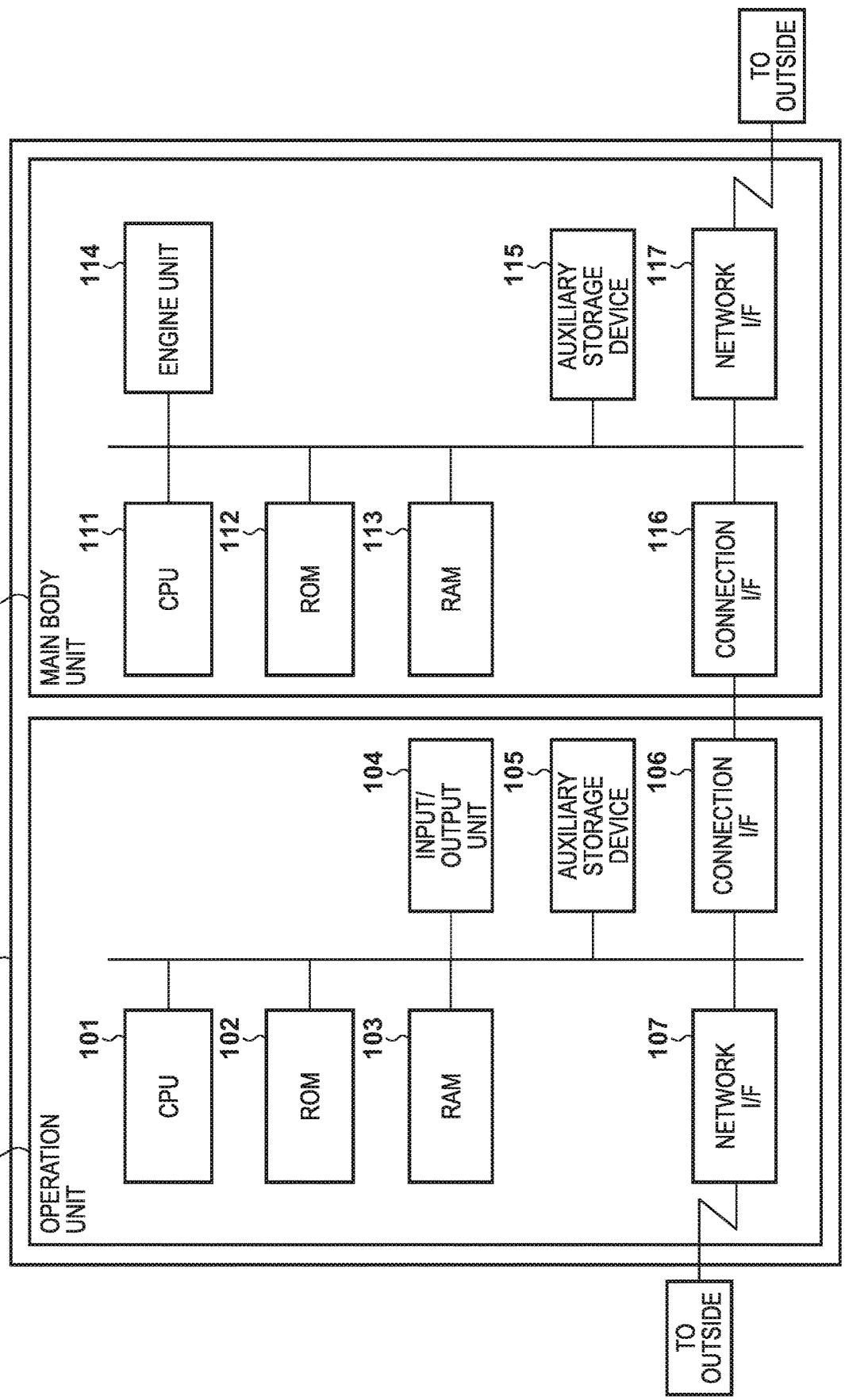

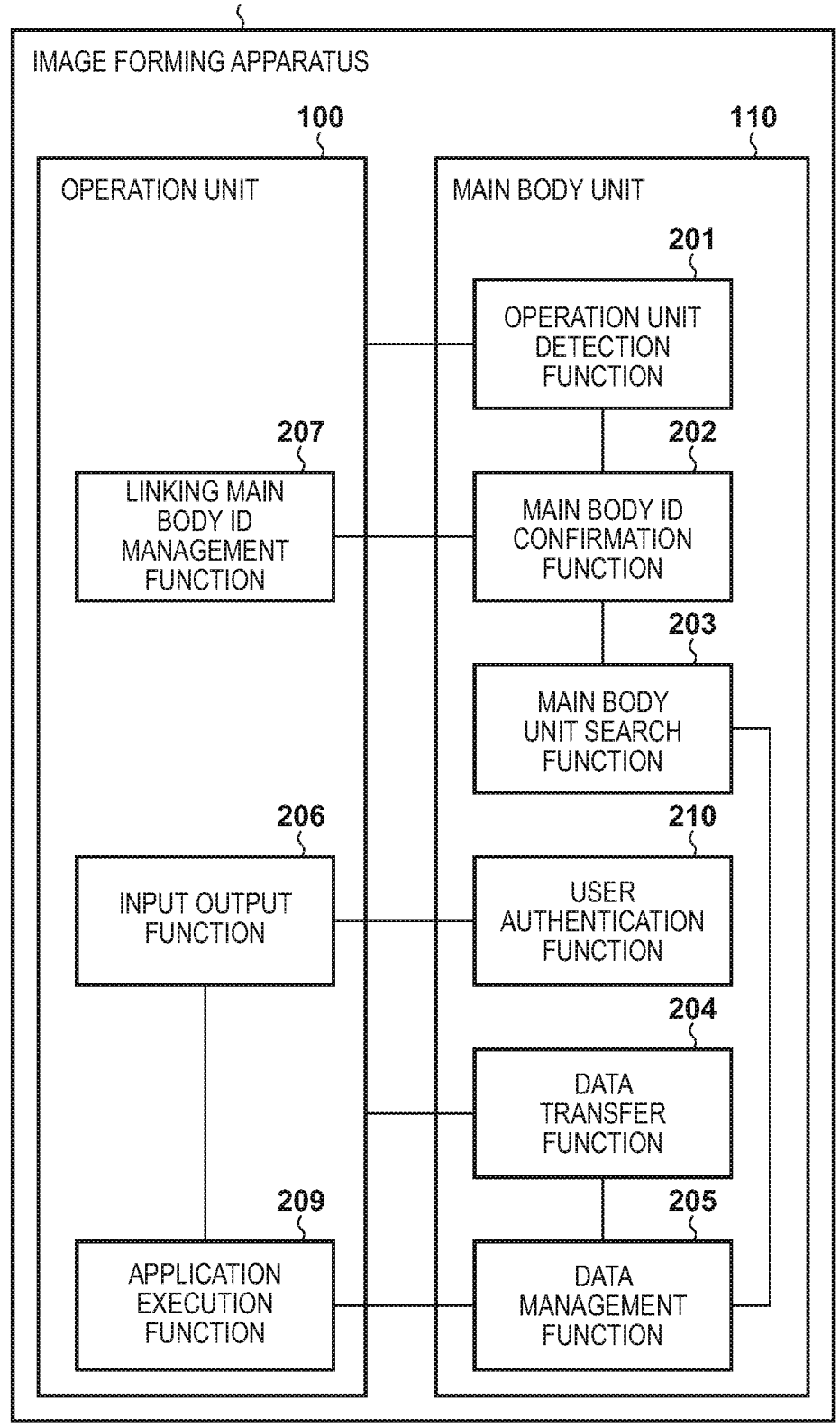

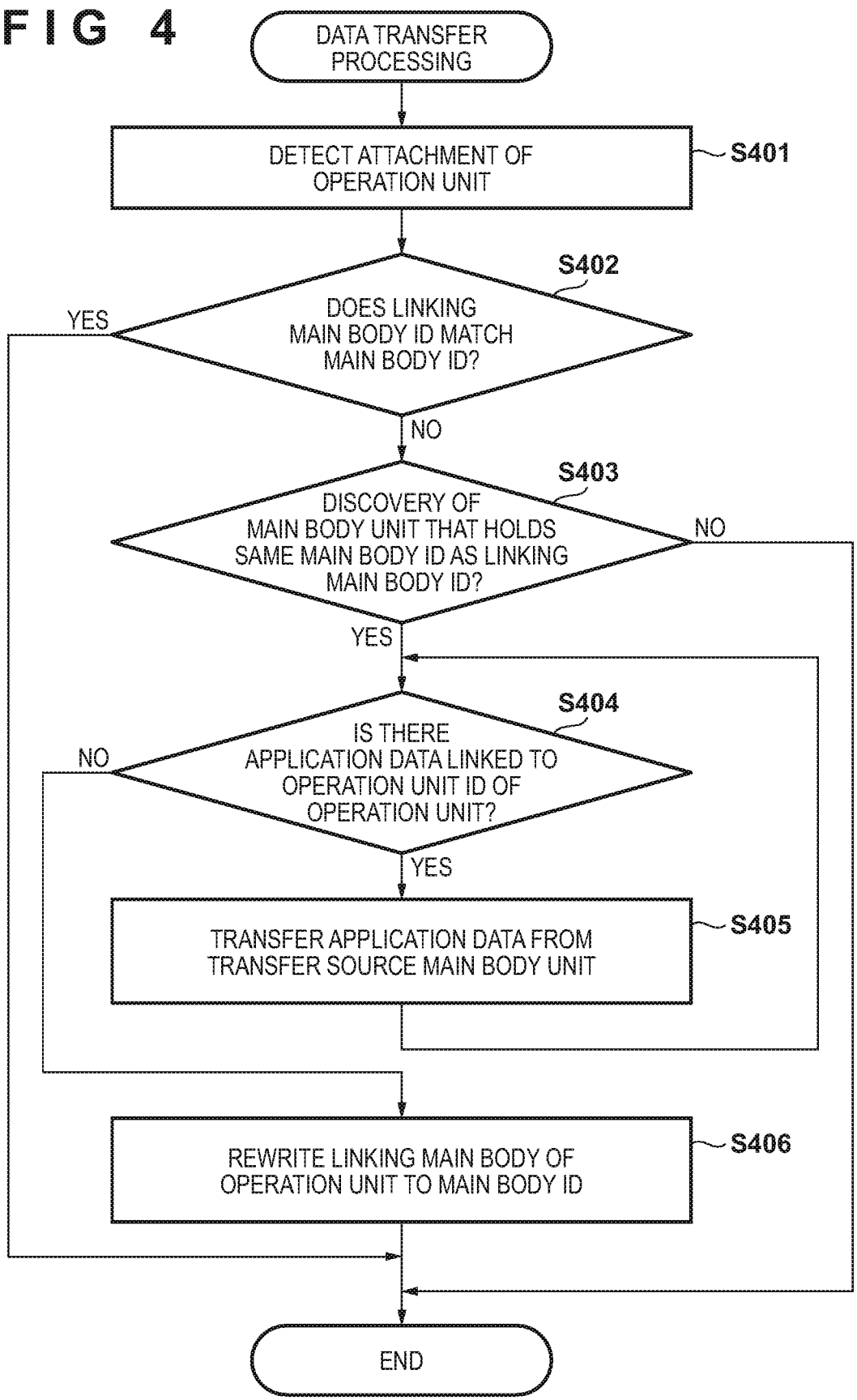

INFORMATION PROCESSING APPARATUS AND METHOD OF TRANSFERRING DATA

BACKGROUND OF THE INVENTION

Field of the Invention

The present invention relates to an information processing apparatus that includes an operation unit and a main body unit capable of using, for example, an application and the like, and a method of transferring data.

Description of the Related Art

Among image forming apparatuses, there is an apparatus which not only performs copying and printing but also in which an application can be installed and used. There is also known an image forming apparatus that is formed from an operation unit, which mainly presents a screen to a user and accepts an operation from the user, and a main body unit, which mainly performs image forming processing (Japanese Patent Laid-Open No. 2017-5475). In such an image forming apparatus, an application can be installed in the operation unit, and the application in the operation unit may operate cooperatively with the main body unit.

The related art, however, does not consider a case in which an operation unit, which has been separated from the main body unit, is to be connected to and used with another main body unit. In a case in which the operation unit is to be connected and used with a main body unit which is not its paired main body unit, the application installed in the operation unit cannot be used when the storage location of data (to be referred to as application data hereinafter) to be used by the application is not in the operation unit.

SUMMARY OF THE INVENTION

The present invention allows, in an image forming apparatus that has separate storage locations for an application and application data, the application to be used even when an operation unit which had been connected to a paired main body unit is connected to another main body unit.

The present invention includes the following arrangement.

According to the first aspect of the present invention, there is provided an information processing apparatus comprising: an application unit in which at least one application is installed; and a data unit configured to store application data corresponding to the at least one application, wherein the application unit and the data unit can be connected to or separated from each other, the data unit determines, when connected to the application unit, whether the connected application unit is linked to the data unit, and in a case in which the application unit is not linked to the data unit, the data unit obtains the application data from a second data unit linked to the connected application unit, stores the obtained application data, and causes the connected application unit to store information to link the data unit connected to the application unit.

According to the second aspect of the present invention, there is provided an information processing apparatus that can connect to an application unit in which at least one application is installed, wherein application data corresponding to the at least one application is stored, upon being connected to the application unit, whether the connected application unit is linked to a data unit is determined, in a case in which the connected application unit is not linked to the data unit, the application data is obtained from a second data unit linked to the connected application unit, the obtained application data is stored, and the connected application unit is made to store information to link the data unit connected to the application unit.

According to the present invention, in an information processing apparatus that has separate storage locations for an application and application data, the application data can be inherited and the application can be used even when connection to their respective storage locations is changed.

Further features of the present invention will become apparent from the following description of exemplary embodiments (with reference to the attached drawings).

BRIEF DESCRIPTION OF THE DRAWINGS

FIG. 1 is a block diagram showing a hardware arrangement;

FIG. 2B is a block diagram showing a functional arrangement;

FIG. 4 is a flowchart illustrating an example of the procedure of data transfer processing;

DESCRIPTION OF THE EMBODIMENTS

The present invention will be described in detail below based on preferred embodiments of the present invention with reference to the accompanying drawings. Note that arrangements to be described in the following embodiments are merely examples, and the present invention is not limited to the illustrated arrangements.

First Embodiment

System Arrangement

Figure 11:
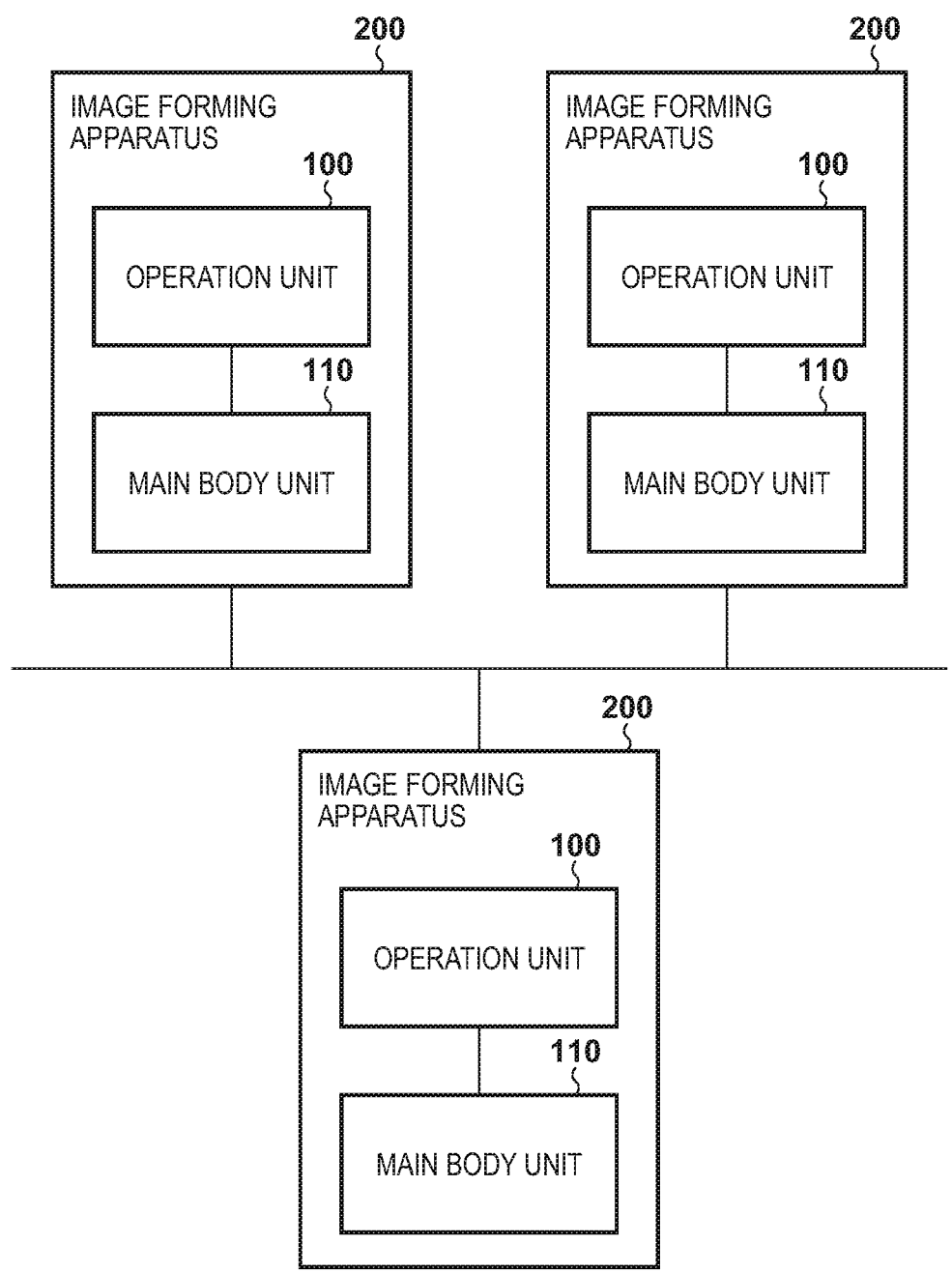
FIG. 11 is a block diagram showing an example of the device configuration of a system.

FIG. 11 is a block diagram showing an example of the arrangement of a system according to an embodiment. In the system according to this embodiment, a plurality of image forming apparatuses 200 are connected by a network (such as a LAN), and the image forming apparatuses 200 can exchange data via their respective network I/Fs 117. Each image forming apparatus 200 includes a main body unit 110 and an operation unit 100. A server which holds an association table of IP addresses of the image forming apparatuses 200 may also be connected to the network of the system according to this embodiment. As will be described later, since an application is installed in the operation unit 100, it may also be referred to as an application unit. Since application data is installed in the main body unit 110, it may also be referred to as a data unit. In addition, from the viewpoint of an application, each image forming apparatus 200 may also be referred to as an information processing apparatus that executes a program.

FIG. 1 is a block diagram showing an example of the hardware arrangement of the image forming apparatus 200 according to this embodiment. The image forming apparatus 200 includes an operation unit 100 and a main body unit 110. The operation unit 100 and the main body unit 110 are connected via a connection I/F 106 and a connection I/F 116 by using an USB cable or the like and can be separated from each other. For example, when the main body unit 110 has broken down or when an office is to be relocated, it is possible to detach the main body unit 110 from the operation unit 100 to which it had been connected and connect the detached main body unit to another main body unit 110.

A CPU (central processing unit) 101 is formed from a microprocessor or the like and controls the overall operation unit 100. A ROM 102 stores programs and the like which are to be executed by the CPU 101. A RAM 103 stores a program being executed by the CPU 101 and temporarily stores data which is used together with the executed program. An auxiliary storage device 105 stores programs, data, and the like. The auxiliary storage device 105 is formed from a hard disk, a USB memory, an SD card, or the like. An input/output unit 104 inputs and outputs information and is formed from buttons, a touch display, a touch panel, and the like. The input/output unit 104 may be formed separately by an input unit and an output unit. A network I/F 107 connects the operation unit to an external apparatus. The connection I/F 106 connects the operation unit 100 to the main body unit 110 and executes communication concerning the processing contents of the units.

A CPU 111 is formed from a microprocessor or the like and controls the overall main body unit 110. A ROM 112 stores programs and the like which are to be executed by the CPU 111. A RAM 113 stores a program being executed by the CPU 111 and temporarily stores data which is used together with the executed program. An auxiliary storage device 115 stores programs, data, and the like. The auxiliary storage device 115 is formed from a hard disk, a USB memory, an SD card, or the like. The capacity of the auxiliary storage device 115 is larger than that of the auxiliary storage device 105 in general. An engine unit 114 performs image data processing and control of a scanner, a printer, and the like in the image forming apparatus. The main body unit 110 also includes the scanner and the printer (both not shown) which are controlled by the engine unit 114. The network I/F 117 and the connection I/F 116 are arranged in the same manner as the network I/F 107 and the connection I/F 106, respectively.

Arrangement of Application and Application Data

Figure 3A:
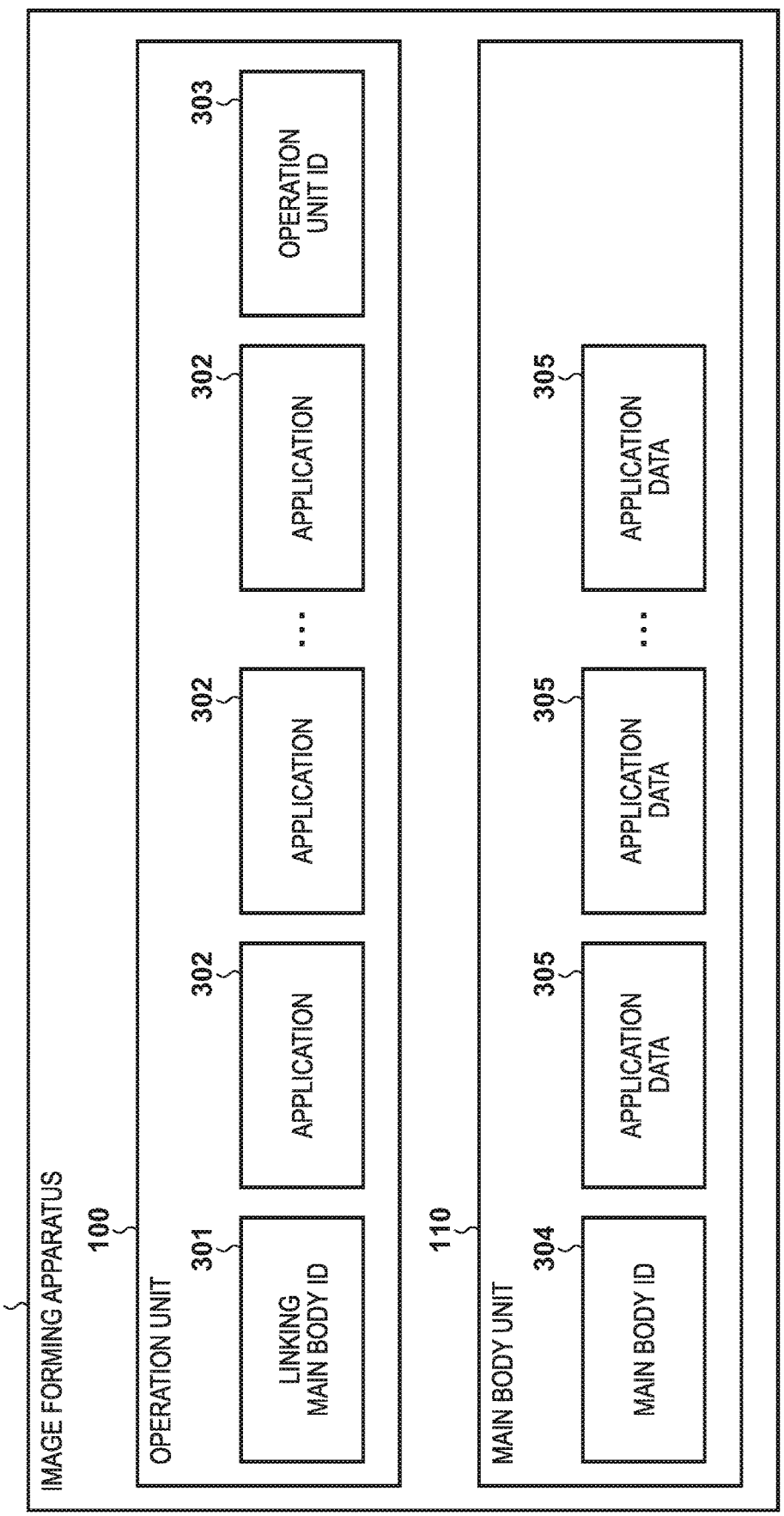
FIG. 3A is a block diagram showing an example of a data arrangement.

FIG. 3A is a block diagram showing an example of the data arrangement of the image forming apparatus according to this embodiment. The image forming apparatus 200 shown in FIG. 1 corresponds to the image forming apparatus 200 shown in FIG. 3A.

The operation unit 100 holds a linking main body ID 301, a plurality of applications 302, and an operation unit ID 303. The data of the operation unit 100 is stored in the auxiliary storage device 105. Static data of the operation unit ID 303 or the like may be stored in the ROM 102. The installation of each application 302 in the operation unit 100 allows a user to use the application 302 quickly.

The linking main body ID 301 is a copy of a main body ID 304 of the main body unit 110 to which the operation unit 100 is connected, and the linking main body ID is used to specify the main body unit 110 to which the operation unit 100 is connected. If the operation unit 100 is in a state in which it is not currently connected to any main body unit, the linking main body ID 301 will indicate the main body ID 304 of the main body unit 110 to which the operation unit 100 had been last connected.

Each application 302 is an execution file of a usable application installed directly or indirectly in the operation unit 100 by a user of the image forming apparatus 200. The application 302 corresponds to its execution and uses one or more sets of application data 305 stored in the main body unit 110. The application 302 may be provided with a license which allows it to be used by a specific operation unit 100. The operation unit ID 303 is a constant identifier for uniquely identifying the operation unit 100.

The main body unit 110 holds the main body ID 304, the plurality of application data 305, and main body data 306. The data is stored in the auxiliary storage device 115. Static data such as the operation unit ID 303 and the like may be stored in the ROM 112. The application data 305 is stored in the main body unit 110 because the capacity of the operation unit 100 is generally small.

The main body ID 304 is an identifier for uniquely identifying the main body unit 110. The application data 305 is data used by each application 302. Other than resources such as image data, voice data, video data, and the like, the application data 305 may be formed from a setting file of each application 302. Each application data 305 is linked to an operation unit ID 303. That is, for example, the operation ID of the linked operation unit 100 is included in the application data 305. The application data 305 may be stored in the main body unit simultaneously when a corresponding one of the applications 302 is stored, may be additionally downloaded later, or may be generated during the execution of the corresponding application 302. Data expressed by one application data 305 may be in the form of a folder storing a plurality of data, a single file, or a single file storing a plurality of data.

Figure 12:
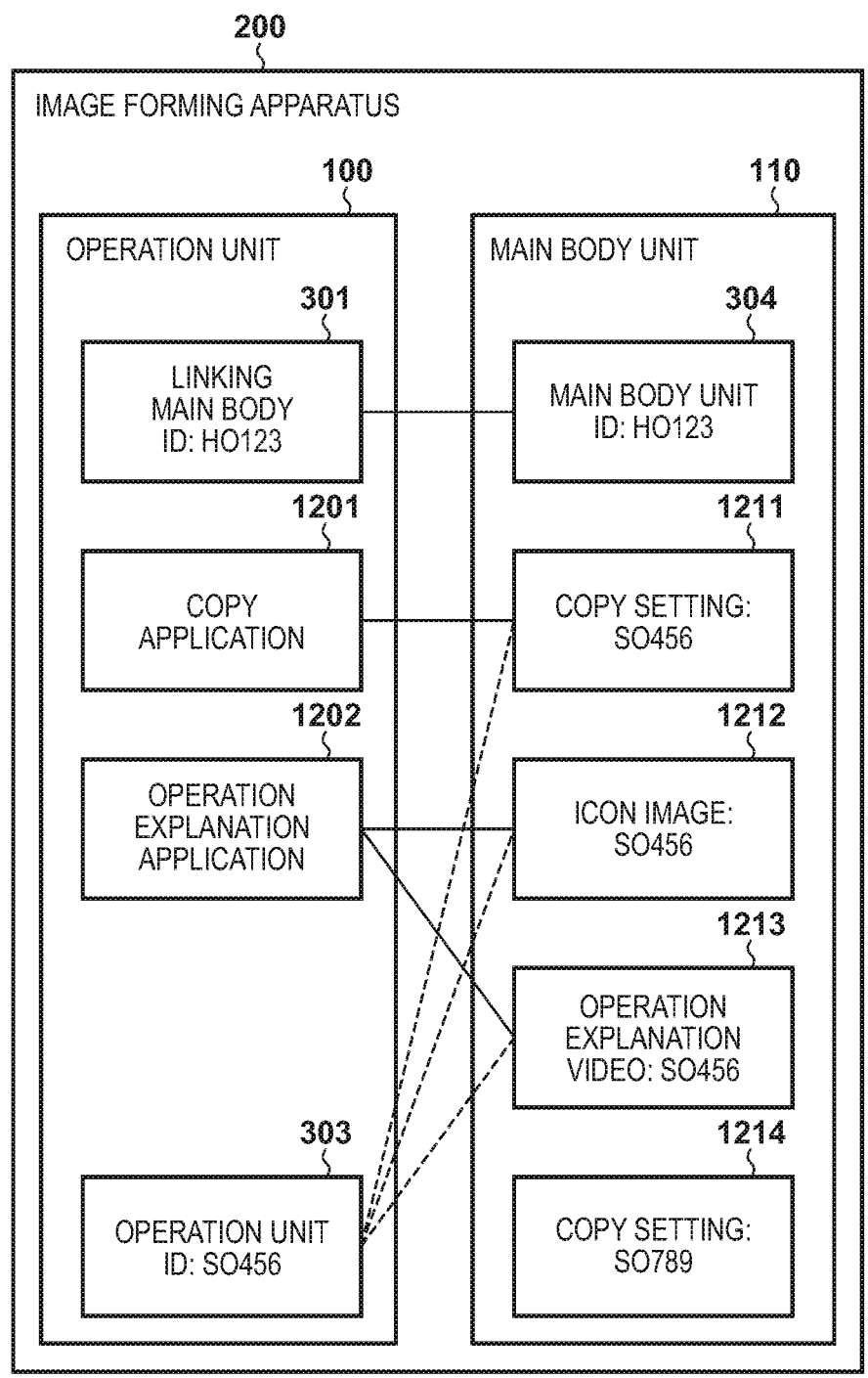
FIG. 12 is a block diagram showing a more specific example of a data arrangement.

FIG. 12 is a block diagram showing a more specific example of the data arrangement of the image forming apparatus 200 according to this embodiment. The image forming apparatus 200 shown in FIG. 12 is formed from the main body unit 110 whose main body ID 304 is "HO123" and the operation unit 100 whose operation unit ID 303 is "SO456", and the operation unit 100 is detachable.

The operation unit 100 holds a linking main body ID "HO123" which has the same value as the value of the main ID "HO123" of the main body unit 110 to which it is connected. When the operation unit 100 is detached from the main body unit 110 and is connected to another main body unit, the linking main body ID is rewritten to the main body ID of the operation unit 100. As examples of the applications 302, a copy application 1201, by which the user can perform copy processing, and an operation explanation application 1202, by which the user can confirm the operation method of the image forming apparatus, are installed in the operation unit 100. The user of the image forming apparatus 200 can use these applications. The application data used by each application is stored in the main body unit 110.

The copy application 1201 uses copy setting 1211 which is the application data for the copy application. The copy setting 1211 is the application data storing setting items such as the printing method of the copy application.

The operation explanation application 1202 uses an icon image 1212 and an operation explanation video 1213 which are the application data of the operation explanation application. The icon image 1212 is image data of the icon that displays the operation explanation application 1202, and the operation explanation video 1213 is video data for the operation explanation which is to be displayed by the operation explanation application 1202.

Each application data is linked to the operation unit ID 303 of the operation unit 100 which can use the application data. The application data 305 that can be used by the operation unit 100 is application data stored in the operation unit 100 which is linked to its own operation unit ID 303. In terms of the example shown in FIG. 12, the operation unit 100 whose operation unit ID is "SO456" uses the copy setting which is the application data linked to the operation unit ID "SO456". However, the operation unit does not use the copy setting linked to the operation unit ID "SO789". The copy application 1201 and the operation explanation application 1202 of the operation unit 100 do not depend on a specific main body unit 110 and can be used when the operation unit is connected to another main body unit. However, the applications require their respective application data linked to their own operation ID. In this manner, the applications 302 installed in the operation unit 100 are restricted to using the application data 305 that can be used.

Functional Arrangement of Image Forming Apparatus

Figure 2A:
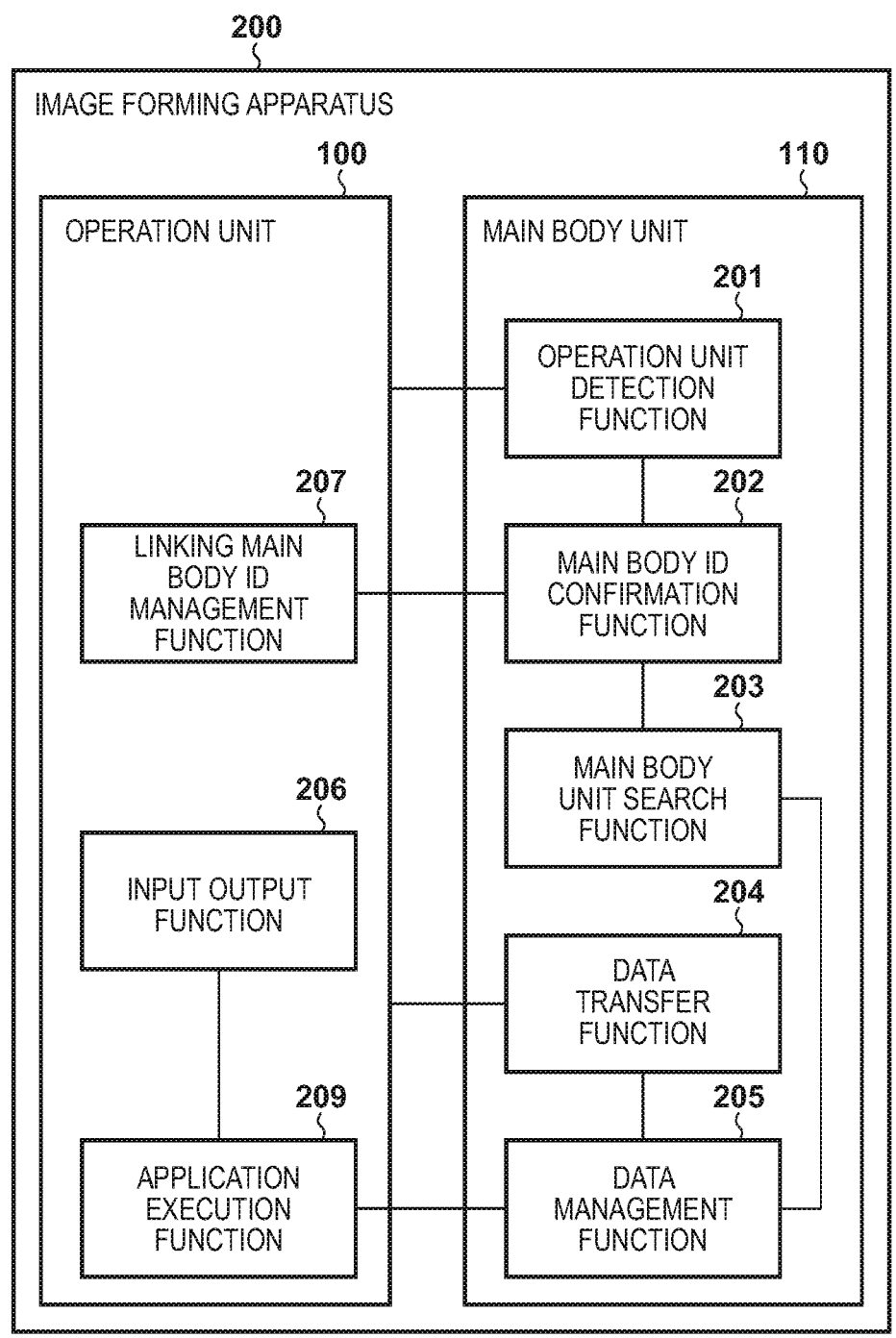
FIG. 2A is a block diagram showing a functional arrangement.

FIG. 2A is a block diagram showing an example of the functional arrangement of the image forming apparatus 200 according to this embodiment. The image forming apparatus shown in FIG. 1 corresponds to the image forming apparatus 200 shown in FIG. 2A. The operation unit 100 has a set of functions which are formed from an input/output function 206, a linking main body ID management function 207, and an application execution function 209. The main body unit 110 has a set of functions which are formed from an operation unit detection function 201, a main body ID confirmation function 202, a main body unit search function 203, a data transfer function 204, and a data management function 205. The functions of the image forming apparatus 200 are implemented by the CPU 101 reading out a program from the ROM 102 or the like and executing the program. Note that the functions to be described here are so-called basic functions excluding the additional functions which are implemented by executing the applications 302. Note that each function to be described hereinafter is a functional whole and may also be referred to as a "portion" or a "unit".

The functions of the operation unit 100 will be described first. The input/output function 206 accepts input from the user and provides information to the user via the input/output unit 104. That is, the input/output function provides a user interface. The linking main body ID management function 207 stores or rewrites the linking main body ID 301. The application execution function 209 executes each application 302 installed in the operation unit 100. The application execution function also transmits a request to the main body unit 110 for the application data 305 as needed.

In the main body unit 110, the operation unit detection function 201 detects that the operation unit 100 is connected by the connection I/F 116. The main body ID confirmation function 202 determines whether the linking main body ID 301 of the operation unit 100 and the main body ID 304 of the main body unit 110 match. The main body unit search function 203 searches for a specific main body unit 110 by using the linking main body ID 301 as a key. The data transfer function 204 transfers, via the network I/F 117, the application data 305 between main body units. The data management function 205 manages the application data 305 and determines whether the application data is linked to a specific operation unit ID 303.

Data Transfer Processing

The procedure of processing according to this embodiment will be described with reference to the flowchart of FIG. 4. First, in this embodiment, an example of the procedure of processing for transferring data from a given main body unit to another main body unit will be described with reference to the flowchart of FIG. 4. The processing of FIG. 4 is implemented by a computer program executed by the operation unit 100 and the main body unit 110 which is in a disconnected state.

First, the operation unit detection function 201 detects that the operation unit 100 has been connected to the main body unit 110 (step S401). For the sake of descriptive convenience, the operation unit 110 to which the operation unit has been connected will be referred to as a transfer destination main body unit. Note that the start of the processes of step S402 and subsequent steps may be triggered by detecting the connection of the operation unit 100 to the main body unit 110.

Next, the main body ID confirmation function 202 obtains the linking main body ID 301 of the connected operation unit 100 and determines whether the value of the linking main body ID matches the value of the main body ID 304 of the main body unit 110 (step S402). If the values match, the processing ends without further operations. A case in which the values match can be determined as a case in which the main body unit has been reconnected to the operation unit 100 that had been originally connected.

If the values do not match, the main body unit search function 203 searches the network for the main body unit 110 that has the same main body ID 304 as the linking main body ID 301 (step S403). That is, the main body unit search function searches for the main body unit to which the operation unit was originally connected. As a result of the search, if the main body unit with the same main body ID cannot be discovered, the processing ends.

As the method of searching for the main body unit 110 with the main body ID 304 by using the linking main body ID 301, a method of, for example, preparing a server which has an association table of the main body IDs 304 and the IP addresses of the main body units 110 and searching for the associated IP address in the association table can be considered. However, other methods can be used. For example, a method in which the main body unit search function makes an inquiry by broadcasting the main body ID 304 and waits for a response from the corresponding main body unit 110 may be adopted. Also, if a static IP address is assigned to each main body unit 110 and the IP address is used as the main body ID 304, it is possible to conduct the search by using an address resolution protocol.

If the corresponding main body unit 110 is discovered in step S403 (the discovered main body unit 110 will be referred to as a transfer source main body unit hereinafter), the data management function 205 makes an inquiry to the transfer source main body as to whether it is linked to the operation unit ID 303 of the operation unit 100 connected to the transfer destination main body unit and whether it internally holds the application data 305 which has not been transferred to the transfer destination main body unit. In response to the inquiry, the transfer source main body transmits a response concerning the presence/absence of the corresponding application data 305. The data management function 205 determines (step S404) the presence/absence of the corresponding data based on the response to the inquiry. If the data is absent, the process advances to step S406. If the data is present, the process branches to step S405.

In step S405, the data transfer function 204 requests the transfer source main body unit to transfer the application data 305, whose presence was determined in step S404, to the transfer destination main body unit. The data transfer function 204 receives the application data 305 transmitted by the data transfer function 204 of the transfer source main body unit in response to the request. The process returns to step S404 to perform the processing for the next application data 305 that has not been transferred yet. Note that the application data 305 that has been transferred successfully is deleted in the transfer source main body unit.

Subsequently, when the transfer of the application data 305, which is to be transferred from the transfer source main body unit to the transfer destination main body unit, has been completed, the linking main body ID management function 207 rewrites the linking main body ID 301 of the operation unit 100 to the main body ID 304 of the transfer destination main body unit (step S406).

By performing the processing in FIG. 4 as described above, the application data 305, which is required to use the corresponding application 302 and is present in the transfer source main body unit, can be transferred to the transfer destination main body unit by using the attachment of the operation unit 100 to the main body unit 110 as a trigger. Note that the processing of FIG. 4 may be executed repetitively each time the operation unit detection function 201 detects the attachment of the operation unit 100.

In this case, in step S401, it may be set so that the operation unit 100 will be detected when the main body unit 110 is powered on.

In step S403, if the main body unit 110 that has the same main body ID 304 as the linking main body ID 301 cannot be discovered, the input/output function 206 may be used to present this result to the user. It may also be set so that the process of step S403 is executed again after a predetermined time has elapsed. Additionally, in step S403, if the main body unit 110 that has the same main body ID 304 as the linking main body ID 301 cannot be discovered, it may be set so that the application 302 can be used temporarily by creating the application data 305 temporarily in the main body unit 110.

In step S405, if the application 302 that is to use the transferred application data 305 is not present because it had been already uninstalled from the operation unit 100 or if the application 302 cannot be used in the transfer destination main body unit, the data transfer need not be performed. In such a case, a request to delete the unusable application data 305 may be transmitted to the transfer source main body unit, and this unusable application data 305 may be deleted in the transfer source main body unit.

Application Execution Processing

Figure 5:
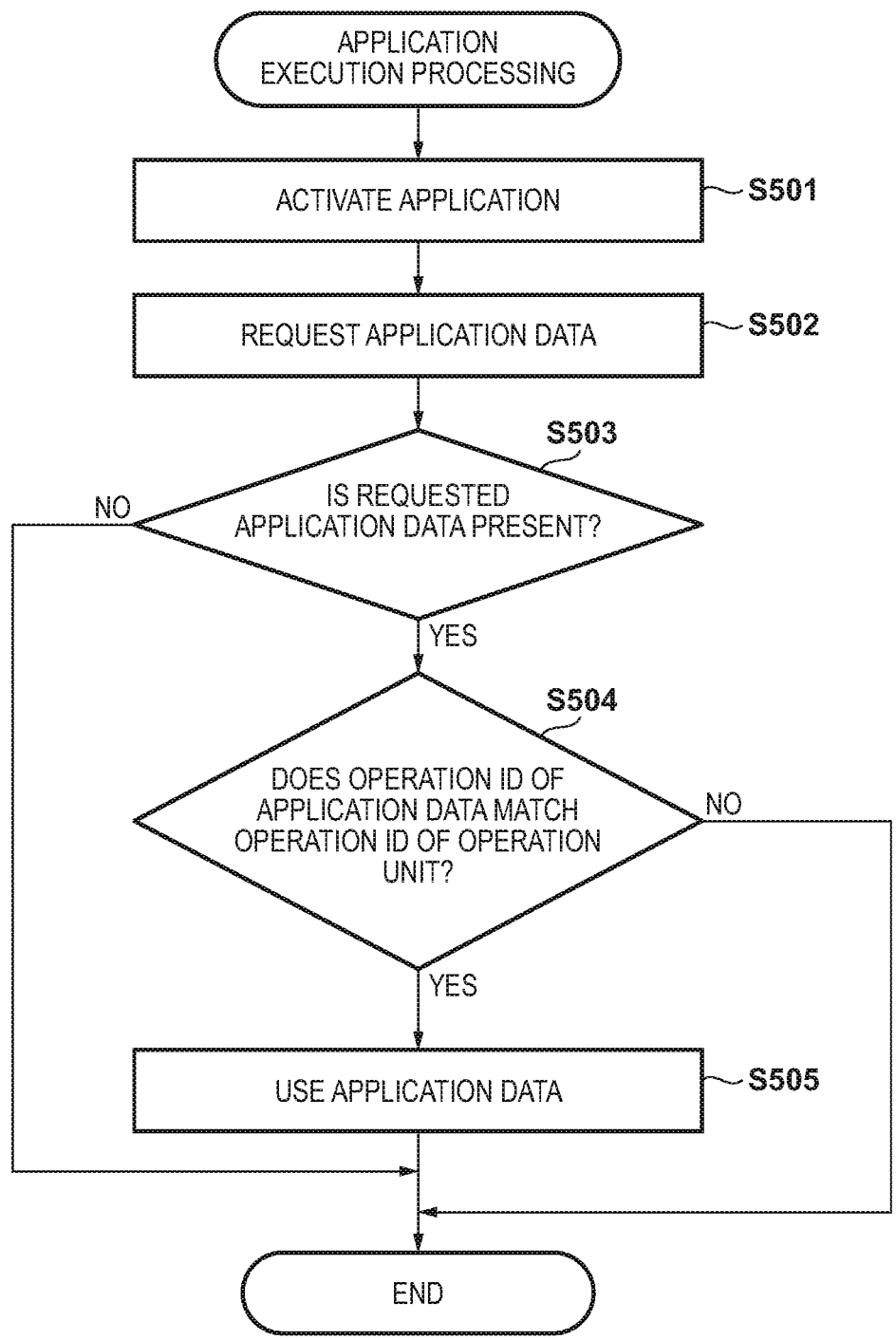
FIG. 5 is a flowchart illustrating an example of the procedure of application execution processing.

An example of the procedure of application execution processing in the image forming apparatus 200 according to this embodiment will be described next with reference to the flowchart of FIG. 5. First, the application execution function 209 of the operation unit 100 activates the application 302 upon receiving an instruction from the input/output function 206 (step S501). When the application data 305 becomes necessary during the execution of the application 302, the application execution function 209 makes a request for the application data 305 by transmitting the operation unit ID 303 to the data management function 205 of the main body unit 110 (step S502). The application data corresponding to the application can be specified by forming the application data 305 so that it can be specified by, for example, application identification information or the like provided to each application. In this case, the application identification information (application ID) is also transmitted to the main body unit 110 together with the operation unit ID 303.

The data management function 205 confirms that one or more requested application data 305 are present (step S503). The application data to be confirmed in step S503 is the application data corresponding to the designated application. If the corresponding application data 305 is absent, the processing ends without operation. In this case, the application 302 may be notified that the application data 305 cannot be used.

If the application data 305 requested in step S503 is discovered, the data management function 205 determines whether the operation unit ID 303 linked to the discovered one or more application data 305 matches the operation unit ID 303 of the operation unit 100 (step S504). If the IDs do not match, the processing ends without further operation. In this case, the application 302 may be notified that the application data 305 cannot be used.

If it is determined that the values match in step S504, the application execution function 209 uses the application data 305 in the application 302 (step S505).

By performing the processing as described above in FIG. 5, the operation unit 100 can use the application 302 by using the application data 305. In order to achieve this, for example, the corresponding application data 305 may be transferred from the main body unit 110 to the operation unit 100. In this case, the application data 305 transferred to the operation unit 100 is handled as a cache in the operation unit 100. Hence, for example, if the application data is changed (including the addition and deletion of data) by the execution of the application 302, the application data is transferred to the main body unit 110 to be written back. The application data may be regularly written back and synchronized.

By performing the described processing by the aforementioned arrangement, it is possible to use, in the image forming apparatus that has separate storage locations for the applications 302 and the application data 305, the application installed in the operation unit 100 even when the connection of the operation unit 100 is changed from the originally connected main body unit 110 to another main body unit 110.

The transfer processing due to the connection change of the operation unit 100 may be executed repetitively by the same method. Hence, even if the main body unit 110 is replaced successively, the application 302 can be executed by using the application data 305 stored in the main body unit 110 to which the operation unit was originally connected. The operation unit 100 has also been arranged to use the application data 305 which is linked to its own operation unit ID. That is, in the main body unit 110, the application data 305 is managed in correspondence with each operation unit 100. Therefore connections from the plurality of operation unit 100 can coexist with respect to one main body unit 110.

Second Embodiment

The second embodiment of the present invention will be described hereinafter. Although the application data 305 was moved from the transfer source main body unit to the transfer destination main body unit in the first embodiment, application data 305 is copied in the second embodiment. Note that the processes other than the data transfer processing and the data deletion processing are the same those described above in the first embodiment, and thus a description will be omitted. Since copying the application data in the transfer processing will increase the amount of the application data 305 in a main body unit 110 with each transfer operation, capacity consumption is greater than that of a case in which the application data 305 is moved by transfer processing. Although deletion of the application data 305 is required to increase the capacity, there is a possibility that data which is to be the copy source at the time of transfer processing will be erased if data is deleted arbitrarily. In order to prevent such a situation, a flag (deletion prohibition flag) representing that the application data 305 should not be deleted will be used.

Deletion Processing

In this embodiment, the application data 305 holds a deletion prohibition flag. The deletion prohibition flag changes to, for example, 1 for a case in which the application data 305 must not be deleted and changes to 0 for a case in which the application data may be deleted, so that it will be obvious when the application data 305 must not be deleted. In a case in which a "deletion prohibition" state is indicated by the deletion prohibition flag, the deletion request to the corresponding application data 305 is rejected even if such a request is made and the application data 305 will not be deleted.

An example of the procedure of processing to delete the application data 305 according to this embodiment will be described with reference to the flowchart of FIG. 13. First, a data management function 205 will accept a data deletion request from a user or from itself with respect to a specific one of the application data 305 (step S1301).

Next, the data management function 205 confirms the deletion prohibition flag of the designated application data 305 (step S1302). If the deletion prohibition flag of the application data 305 is set to 1, the processing ends.

In step S1302, if the deletion prohibition flag of the application data 305 is set to 0, the data management function 205 deletes the application data 305 (step S1303).

Figure 13:
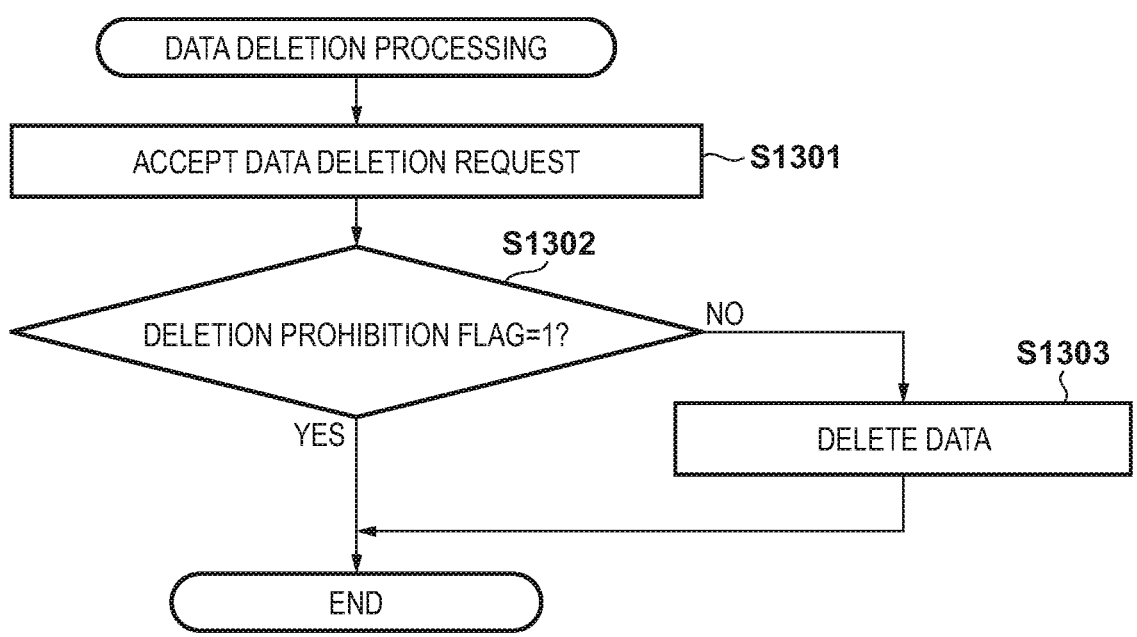
FIG. 13 is a flowchart illustrating an example of the procedure of data deletion processing.

Performing the processing described in FIG. 13 in the above manner allows, when the application data 305 is to be deleted due to the lack of capacity in the main body unit 110 or the like, deletion of only the application data 305 that may be deleted to be performed without deleting the application data 305 that must not be deleted.

Data Transfer Processing

An example of the procedure of the processing to transfer data from a given main body unit to another main body unit according to this embodiment will be described with reference to the flowchart of FIG. 6. The processing procedure of steps S401 to S404 and S406 are the same as that in the first embodiment.

If the application data 305 is present in step S404, the data management function 205 determines whether the same data as the application data 305 is present in the transfer destination main body unit (step S607). The same data refers not only to data of the same application 302 but also to the data of an operation unit 100 to which it is linked. If the same data is present, the process advances to step S608.

On the other hand, if the same data is not present in step S607, a data transfer function 204 copies the application data 305, which was determined to be present in step S404, from the transfer source main body unit to the transfer destination main body unit (step S605). Since this is a copy operation, the application data 305 will be present in both the transfer source main body unit and the transfer destination main body unit after this process.

Next, the data management function 205 changes the deletion prohibition flag of the application data 305 in the transfer destination main body unit to 1 (step S608). The application data 305 to be set as the deletion prohibited target here is either the application data 305 which was determined to be present in the transfer destination main body unit in step S607 or the application data 305 copied in step S605.

Next, the data management function 205 changes the deletion prohibition flag of the application data 305 remaining in the transfer source main body unit to 0 (step S609). The application data 305 to be the deletion permitted target here is the application data 305 which was determined to be present in the transfer source main body unit in step S404. The process returns to step S404 and the same processes are performed with respect to the next application data 305. However, since the copied application data 305 will remain intact in the transfer source main body unit in this embodiment, for example, the processes from step S404 can be repeated by targeting, among the application data 305 discovered in step S403, the application data 305 whose deletion prohibition flag has not been canceled.

Figure 6:
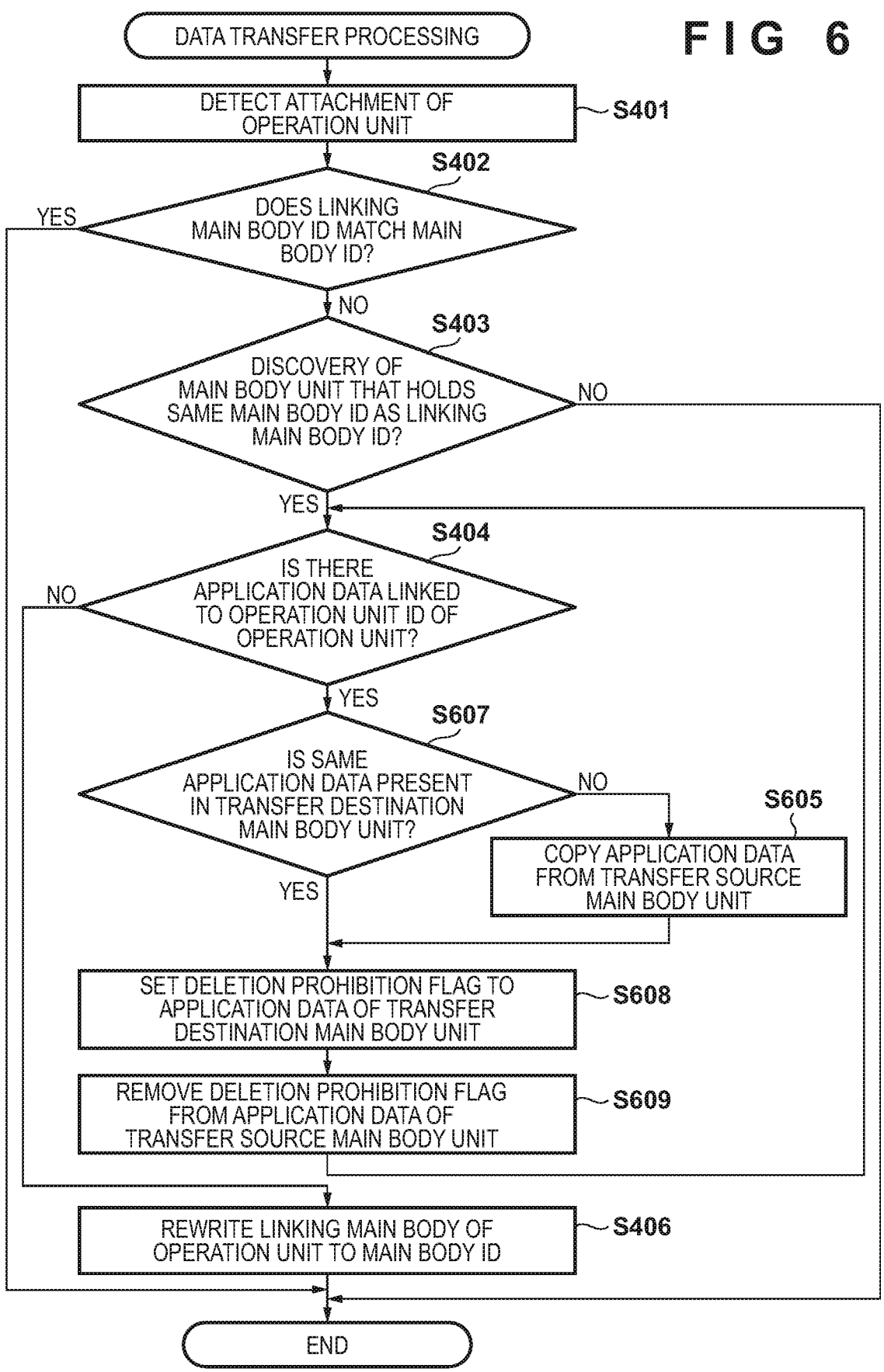
FIG. 6 is a flowchart illustrating an example of the procedure of data transfer processing.

By performing the processing described in FIG. 6 in the above manner, the application data 305 which is required to use the application 302 and is present in the transfer source main body unit can be copied to the transfer destination main body unit by using the attachment of the operation unit 100 to the main body unit 110 as a trigger.

Furthermore, by setting the deletion prohibition flag of the application data 305, which is to be transferred in the transfer processing, to 1 to protect the application data 305 to be copied at the time of the transfer, it is possible to prevent a state in which the data cannot be transferred due to the deletion of the application data 305.

Since performing the above processing in accordance with the aforementioned arrangement creates the possibility that the application data 305 of the application 302 will be remaining in the main body unit 110 to which the operation unit 100 has been connected once, the time required for executing the transfer processing again can be shortened if the application data is remaining, and the transfer destination image forming apparatus can be used immediately. In addition, it is possible to prevent a state in which the main body unit 110 has an insufficient capacity by protecting the application data 305 required for the transfer processing while allowing other application data 305 to be deleted.

Third Embodiment

The third embodiment of the present invention will be described hereinafter. Although the application data 305 of the transfer source main body unit was moved intact to and used in the transfer destination main body unit in the first embodiment, application data 305 will be converted into data that can be used in a case in which the application data cannot be used intact in the transfer destination main body unit in the third embodiment. A case in which the application data cannot be used intact points to a case in which the application data 305, which can be used in a given main body unit, cannot be used in the transfer destination main body unit just by simply moving the application data 305 from the transfer source main body unit due to the device arrangement of an image forming apparatus 200 or other functional restrictions. Note that processes other than the data transfer processing are the same as those in the first embodiment, and thus a description will be omitted.

In a case in which the application data 305 of the transfer source main body unit cannot be used intact in the transfer source main body unit, the transferred application data 305 is converted in the transfer destination main body unit, and the converted application data 305 is used. At this time, a problem arises in that even in a case in which the application data 305 is to be transferred from the transfer destination main body unit to the main body unit that can use the application data 305 of the transfer source main body unit intact, the converted application data 305 will be transferred (moved) to the transfer source main body unit if the data is to be moved in the manner according to the first embodiment. Hence, it will be set so that the pre-conversion application data 305 will be transferred by using a flag (conversion flag) representing that the data has been converted.

In this embodiment, the application data 305 holds a conversion flag. The conversion flag changes, for example, to 1 if the application data 305 has been converted and changes to 0 if the application data has not been converted, so that it will be obvious when the application data 305 has been converted. In this embodiment, a plurality of main body IDs 304 may be written in a linking main body ID 301. Such a case will be described later.

Data Transfer Processing

Figure 7:
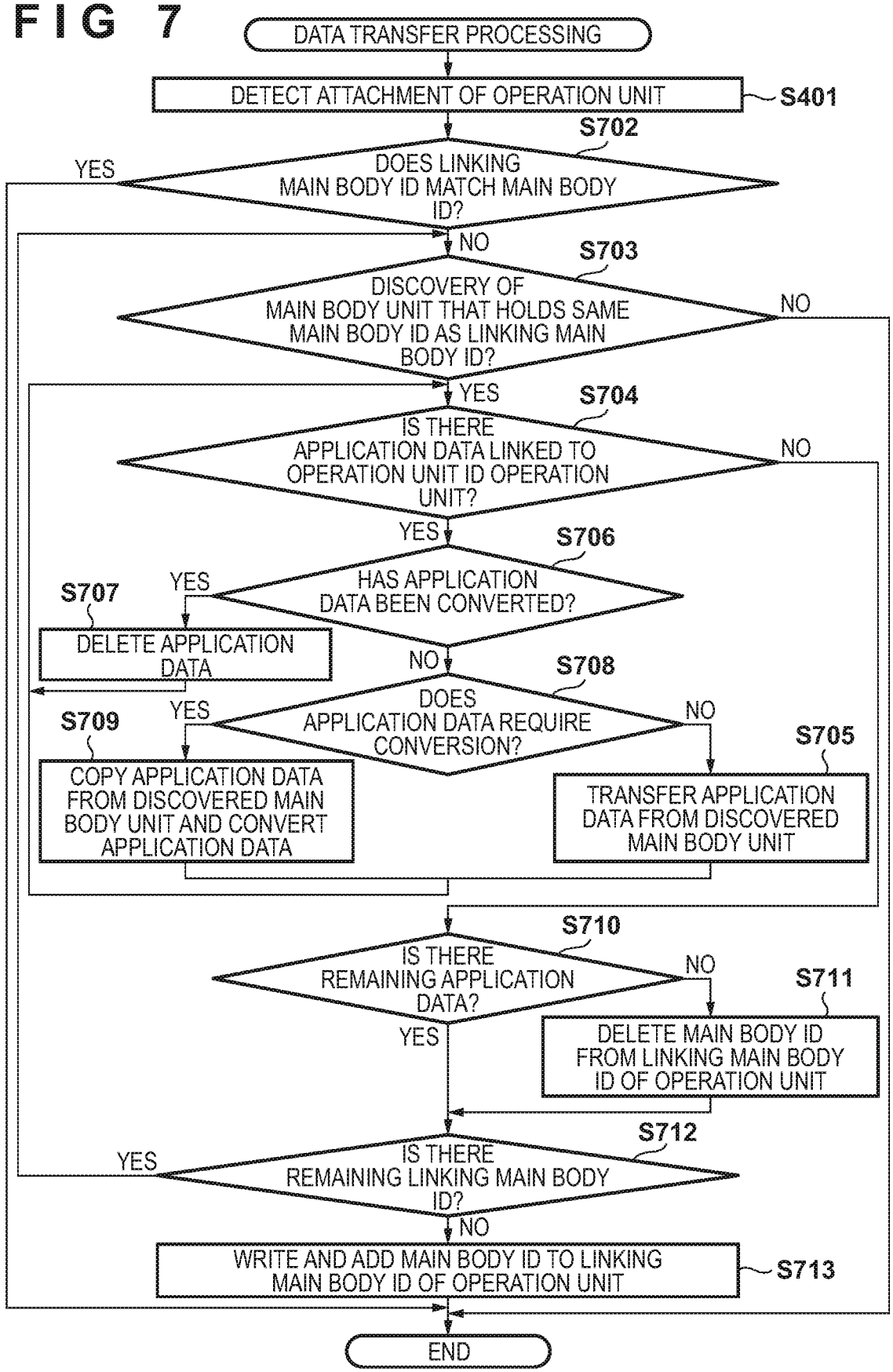
FIG. 7 is a flowchart illustrating an example of the procedure of data transfer processing.

An example of the procedure of processing to transfer, from a given main body unit to another main body unit 110, data including data which requires conversion according to this embodiment will be described with reference to the flowchart of FIG. 7. The process of step S401 of FIG. 7 is the same as the process of step S401 of FIG. 4. The process advances to step S702 when the connection of the operation unit 100 is detected.

Next, a main body ID confirmation function 202 determines whether the latest value of the linking main body ID 301 of the connected operation unit 100 matches the value of the main body ID 304 of the main body unit 110 (step S702). If the values match, the processing ends without further operation. Whether the value of the linking main body ID 301 is the latest value can be determined by, for example, ordering the main body IDs 304 in time series or making the main body ID hold time information. Note that in a case in which the linking main body ID 301 is simply mentioned in the following explanation, it points to the latest linking main body ID 301.

If the values are determined not to match in step S702, a main body unit search function 203 searches for the main body unit 110 that holds the same main body ID 304 as the linking main body ID 301 (step S703). If the main body unit cannot be discovered as a result of the search, the processing ends. This is the same as the process of step S403.

If the main body unit 110 is discovered in step S703, a data management function 205 makes an inquiry as to whether the application data 305 linked to the operation unit ID 303 of an operation unit 100, which is connected to the transfer destination main body unit, is present in the discovered main body unit 110, and determines the presence/absence of the application data 305 based on the response (step S704). If the application data is not present, the process advances to step S710. The main body unit 110 discovered here will be referred to as a main body unit of interest. A main body unit of interest is a main body unit that is to be a transfer source main body unit candidate.

If it is determined that the corresponding application data 305 is present in step S704, the data management function 205 uses the conversion flag to determine whether the application data 305 has been converted (step S706). This determination can also be performed by making an inquiry to the main body unit 110 of interest. If the data has not been converted, the process advances to step S708.

In step S706, if it is determined that the application data 305 held by the main body unit 110 of interest in step S704 has been converted, the data management function 205 requests the main body unit 110 of interest to delete this application data, and the requested main body unit 110 of interest deletes the deletion requested application data 305 (step S707). The process returns to step S704, and the processing for the next application data 305 is executed.

If it is determined in step S706 that the application data 305 has not been converted, a data transfer function 204 obtains the specification (specification information) of the transfer destination main body unit to determine whether the application data 305 needs to be converted (step S708). In this case, the main body unit of interest is the transfer destination main body unit.

Table 1 shows a specific example of a data conversion table expressing whether the conversion of the application data 305 is required and the conversion method. The data conversion table may be included in an application 302 or a separate server may be prepared and the data conversion table may be obtained by making an inquiry to the server.

TABLE 1

Data Conversion Table

| Application data | Specification | Effective Value |
| --- | --- | --- |
| print color setting | color printing machine | color, monochrome |
| print color setting | monochrome printing machine | monochrome |
| OCR setting | OCR supporting device | enable, disable |
| OCR setting | OCR non-supporting device | disable |
| ... | ... | ... |

The application data column of the data conversion table shows the application data 305 itself or the name of the data included in the application data 305, the specification column shows the specification and the function of the image forming apparatus, and the effective value column shows the possible value of the application data 305 in the same row with respect to the image forming apparatus with the indicated specification. For example, assume that an image forming apparatus which is formed by the transfer source main body unit is a color printing machine capable of color printing, and an image forming apparatus which is formed by the transfer destination main body unit is a monochrome printing machine incapable of color printing. In this case, if the application data 305 is a print color setting (or includes the print color setting) and its setting values are color values, it can be determined that the conversion (for example, color values to monochrome values) of the application data 305 is required since only monochrome values can be accepted as setting values in the transfer destination main body unit which is a monochrome printing machine. In this manner, conversion into supportable values is determined to be necessary for the application data 305 which cannot be supported by the specification of the transfer destination main body unit. Conversion can be determined to be unnecessary for the application data 305 which is not included in the table and for the application data 305 which is included in the table but is already present as an effective value in the transfer destination main body unit.

The explanation returns to FIG. 7. If it is determined in step S708 that data conversion is unnecessary, the data transfer function 204 transfers the application data 305 from the discovered main body unit 110, which is the transfer source main body unit, to the transfer destination main body unit (step S705). At this time, the application data 305 does not remain in the transfer source main body unit 110. In addition, the conversion flag of the transferred application data 305 is set to 0.

If it is determined in step S708 that data conversion is necessary, the data transfer function 204 makes a copy of the application data 305 from transfer source main body unit 110 to the transfer destination main body unit and converts the data based on the data conversion table (step S709). At this time, the application data 305 remains in the transfer source main body unit 110. In addition, the conversion flag of the copied and converted application data 305 is set to 1.

The conversion of the application data 305 will be described with reference to the data conversion table of Table 1. For example, assume that an image forming apparatus formed by the transfer source main body unit is an OCR supporting device capable of using OCR, and an image forming apparatus formed by the transfer destination main body unit is an OCR non-supporting device incapable of using OCR. In this case, if the application data 305 is (or includes) an OCR setting and its contents are set to "enable" OCR, the application data 305 copied to the transfer destination main body unit is converted into "disable" and its conversion flag is set to 1 since only "disable" can be accepted as a value in the transfer destination main body unit.

The explanation returns to FIG. 7. After the completion of step S705 or step S709, the process returns to step S704, and the processing for the next application data 305 is executed. When there is no application data 305 to be confirmed in step S704, the data management function 205 confirms whether the application data 305 remains in the main body unit 110 of interest (step S710). If there is remaining application data in the main body unit of interest, the process advances to step S712.

If it is determined in step S710 that there is no remaining application data 305 in the main body unit of interest, a linking main body ID management function 207 deletes, from the linking main body ID 301 of the operation unit 100, the same main body ID as the main body ID 304 of the main body unit 110 of interest (step S711).

Next, the linking main body ID management function 207 determines whether there remains the linking main body ID 301 which has not been confirmed yet (step S712). If an unconfirmed linking main body ID remains, the process returns to step S703, and processing is executed for the next linking main body ID 301. Otherwise, the process advances to step S713.

If it is determined in step S712 that there is no remaining linking main body ID 301 to be confirmed, the linking main body ID management function 207 writes and adds the main body ID 304 of the transfer destination main body unit to the linking main body ID 301 of the operation unit 100 (step S713). Therefore, a plurality of the main body IDs 304 may be written in the linking main body ID 301.

By performing the processing described in FIG. 7 in the above manner, the application data 305 can be converted in a case in which the arrangement of the transfer source main body unit and the arrangement of the transfer destination main body unit are different. Furthermore, since the pre-conversion application data 305 is left in the transfer source main body unit, the pre-conversion application data 305 can be used in a case in which the application data is to be transferred to a transfer destination main body unit which has the same arrangement again as the transfer source main body unit.

Note that although the converted application data 305 is deleted in step S707, this deletion process may be performed after all of the remaining application data 305 have been transferred.

Although the application data 305 that requires conversion is copied and converted in step S709, the application data 305 which has not been converted may be arranged in the transfer destination main body unit and the application data 305 may be deleted from the main body unit 110 of interest. In this case, only the main body ID 304 of the transfer destination main body unit needs to be written in the linking main body ID 301.

By executing processing in accordance with the arrangement described above, each time a transfer operation is to be executed between image forming apparatuses with different specifications, the application can be used by using the application data 305 suitable to the image forming apparatus which is formed by the transfer destination main body unit.

Note that this embodiment may be applied to a mode in which the application data 305 is copied in the data transfer processing in the manner shown in the second embodiment. If such a mode is adopted, the conversion operation will not be performed since the transfer operation is not performed if the transfer destination main body unit includes the same application data as the transfer target application data. Furthermore, instead of setting a flag that indicates whether the conversion has been performed, it may be set so that the necessary conversion will be performed at each transfer of application data.

Fourth Embodiment

Figure 3B:
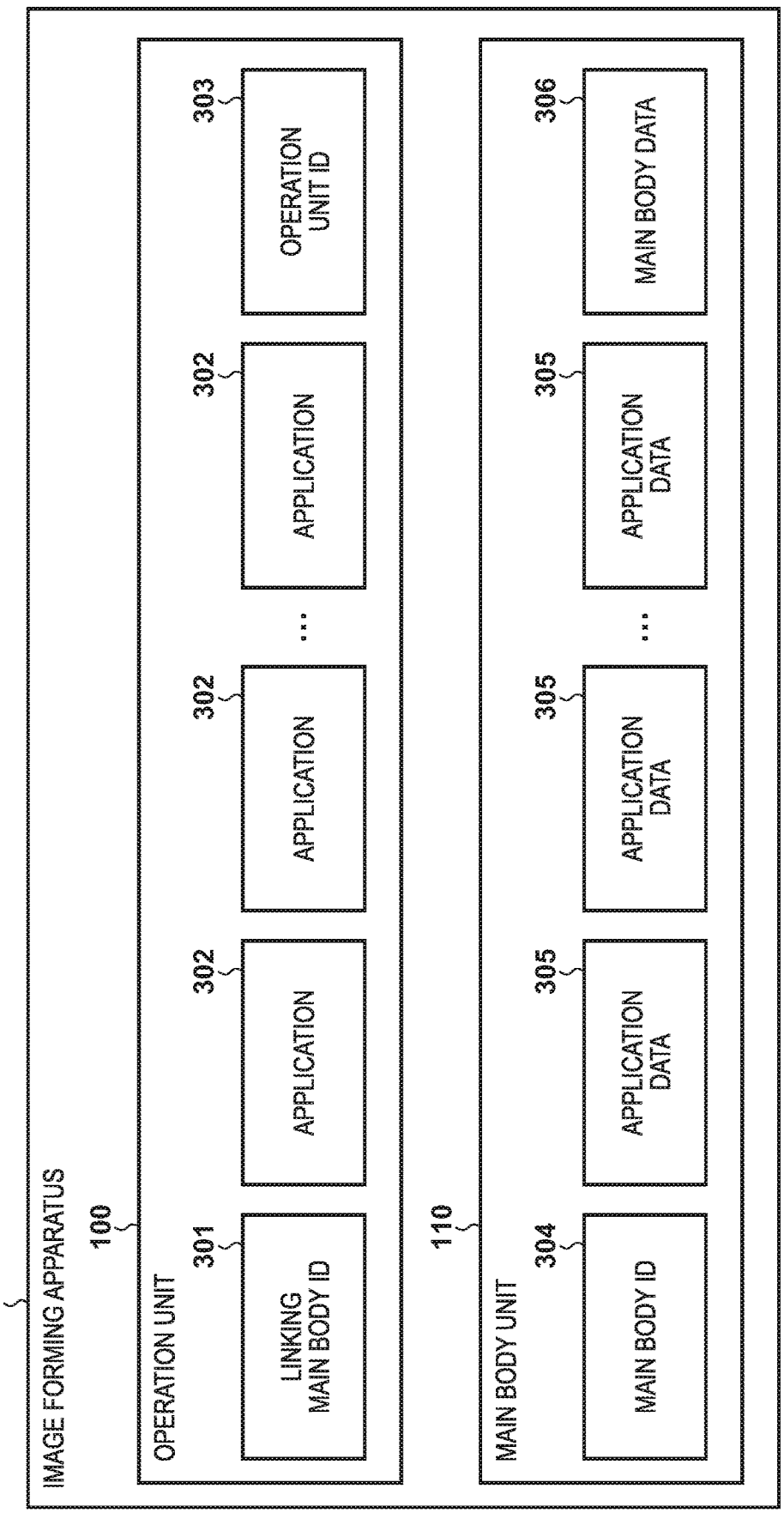
FIG. 3B is a block diagram showing an example of data arrangement.

The fourth embodiment of the present invention will be described hereinafter. Although the application data 305 was transferred in the first to third embodiments, the transfer of data related to the main body unit 110 other than application data 305 will also be performed in the fourth embodiment. Note that arrangements and processes other than the data arrangement and the data transfer processing are the same as those in the above-described first embodiment, and thus a description will be omitted. FIG. 3B is a block diagram showing an example of the data arrangement of an image forming apparatus according to this embodiment. Main body data 306 is data related to the main body unit 110 other than the application data which is to be used by a specific application 302. The main body data 306 may be, other than a resource, a main body setting, a log, user data to be used for user authentication in the image forming apparatus, or the like. The main body data 306 suffices to be data which is not directly related and will not be used by the application 302. The main body data 306 is linked to an operation unit ID 303. Other types of data are the same as those described with reference to FIG. 3A.

Figure 8:
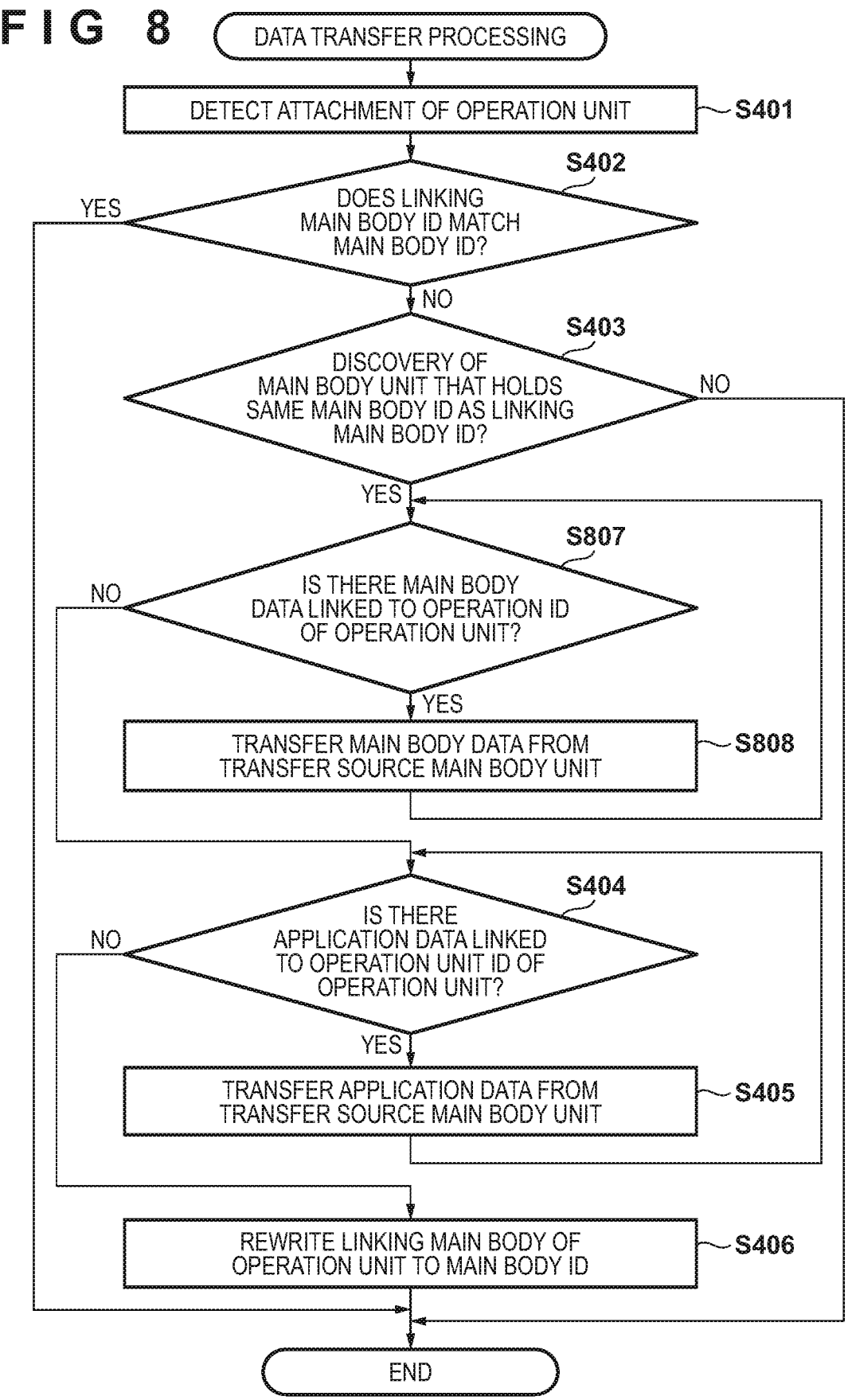
FIG. 8 is a flowchart illustrating an example of the procedure of data transfer processing.

In this embodiment, a data transfer function 204 transfers the application data 305 and the main body data 306 between the main body units via a network I/F 117. In this embodiment, a data management function 205 manages the application data 305 and the main body data 306, creates links to the specific operation unit ID 303, and determines whether the data is linked. In this embodiment, an example of the procedure of the processing to transfer data from a given main body unit to another main body unit will be described with reference to the flowchart of FIG. 8. In FIG. 8, the processing procedure of steps S401 to S403 is the same as that in the first embodiment.

When the main body unit 110 is discovered in step S403, the data management function 205 sets the discovered main body unit 110 as the transfer source main body unit and determines (step S807) whether the transfer source main body unit includes the main body data 306 linked to the operation unit ID 303 of an operation unit 100 that is connected to the transfer destination main body unit 110 which is actually executing the processing of FIG. 4. If the main body data is absent, the process advances to step S404.

The data transfer function 204 transfers the corresponding main body data 306, which was determined to be present in step S807, from the transfer source main body unit to the transfer destination main body unit (step S808). This transfer is implemented by the data transfer function 204 requesting the transfer source main body unit to transmit the main body data, and the transfer source main body unit transmitting the main body data 306 in response to the request. The process subsequently returns to step S807, and the processing is executed for the next main body data 306 if it is present. The processing procedure of steps S404 to S406 is the same as that in the first embodiment.

By performing the processing described in FIG. 8 in the above manner, not only the application data 305 but also the main body data 306 can be transferred. Note that there may be a plurality of main body data 306. Since not only the application data 305 but also the main body data 306 can be transferred by executing processing in accordance with the arrangement described above, the user can further use the transfer destination main body unit in the same manner as the transfer source main body unit. Note that this embodiment may be applied to a mode in which the data is copied in the data transfer processing as in the second embodiment or may be applied to a mode in which the data is converted in the data transfer processing as in the third embodiment.

Fifth Embodiment

The fifth embodiment of the present invention will be described hereinafter. Although the main body data 306 was also transferred in the fourth embodiment, main body data 306 is used to prevent a transfer processing operation that is not desired by a user in the fifth embodiment. Note that arrangements and processes other than the function arrangement and the data transfer processing are the same as those in the above described fourth embodiment, and thus a description will be omitted.

FIG. 2B is a block diagram showing an example of the functional arrangement of an image forming apparatus according to this embodiment. A main body unit 110 has a set of functions formed from a operation unit detection function 201, a main body ID confirmation function 202, a main body unit search function 203, a data transfer function 204, a data management function 205, and a user authentication function 210. The user authentication function 210 performs user authentication in the image forming apparatus by using (for example, collating) information input from an input/output function 206 and user data in the main body data 306. Other than a character string, the information input to be used in the authentication may be biological information, an IC card using RFID, or the like.

In this embodiment, an example of the procedure of processing to transfer data from a given main body unit to another main body unit will be described with reference to the flowchart of FIG. 9. The processing procedure of steps S401 to S403 is the same as that in the first embodiment. If the main body unit 110 is discovered in step S403, the user authentication function 210 obtains, from the transfer source main body unit, the user data included in the main body data 306 that is linked to an operation unit ID 303 of an operation unit 100 which is connected to the transfer destination main body unit, and the user authentication function performs user authentication by using the obtained user data (step S901). If the user authentication fails, the processing ends without further operation. If the user authentication is successful, the process advances to step S807. The processing procedure of steps S807 and S808 is the same as that of FIG. 8 in the fourth embodiment. The processing procedure of steps S404 to S406 is the same as that in the first embodiment.

Figure 9:
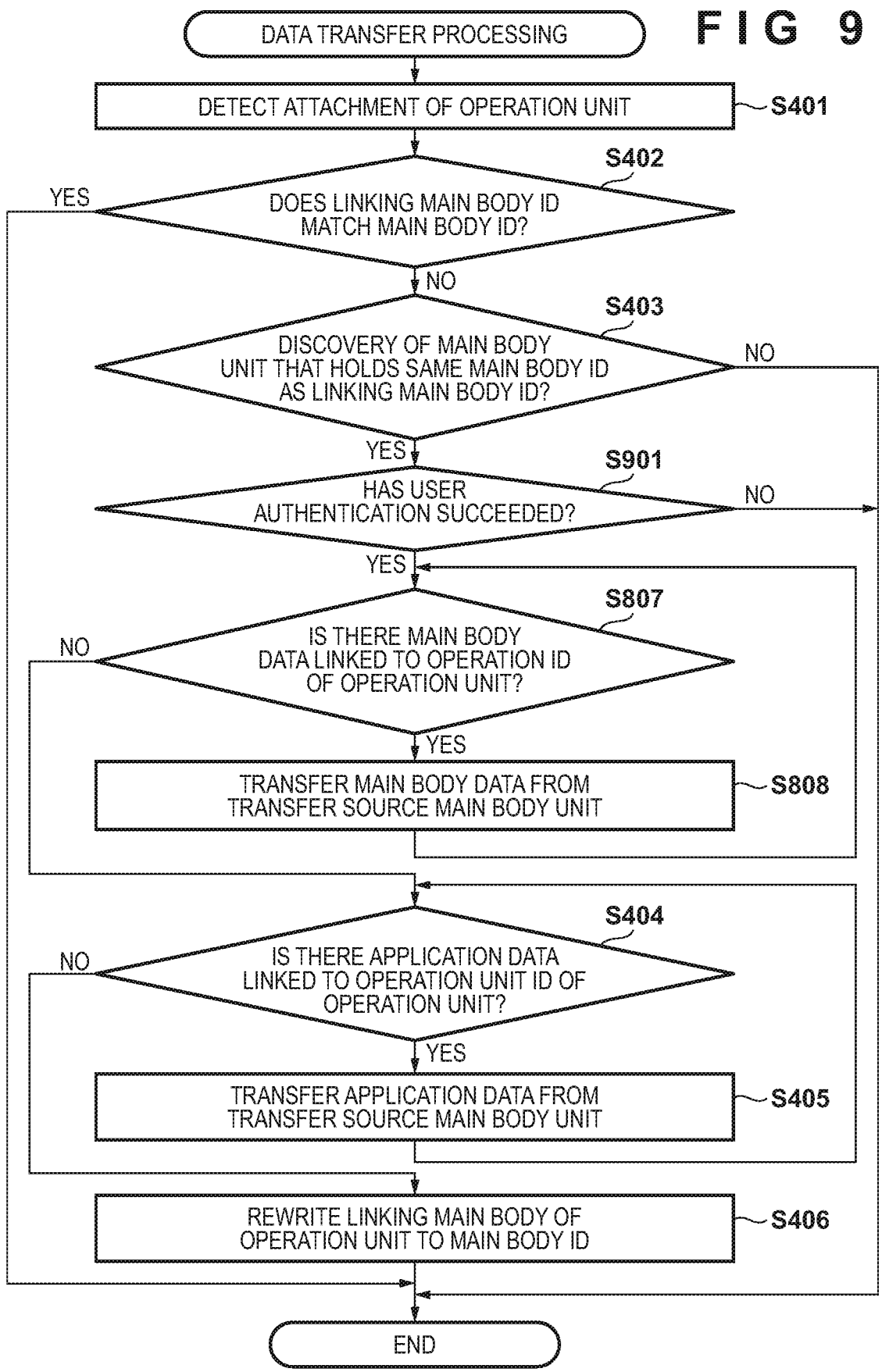
FIG. 9 is a flowchart illustrating an example of the procedure of data transfer processing.

By executing the processing described in FIG. 9 in the above manner, authentication can be performed before the data transfer processing is started. That is, user authentication is performed before executing the transfer of application data and the transfer of main body data, and the data can be transferred only when the authentication has succeeded. Executing processing in accordance with the arrangement described above can restrict or prohibit the execution of application data transfer by a user who has no access authority to the application data and can prevent data transfer processing undesired by the user of the transfer source main body unit.

Sixth Embodiment

Figure 10:
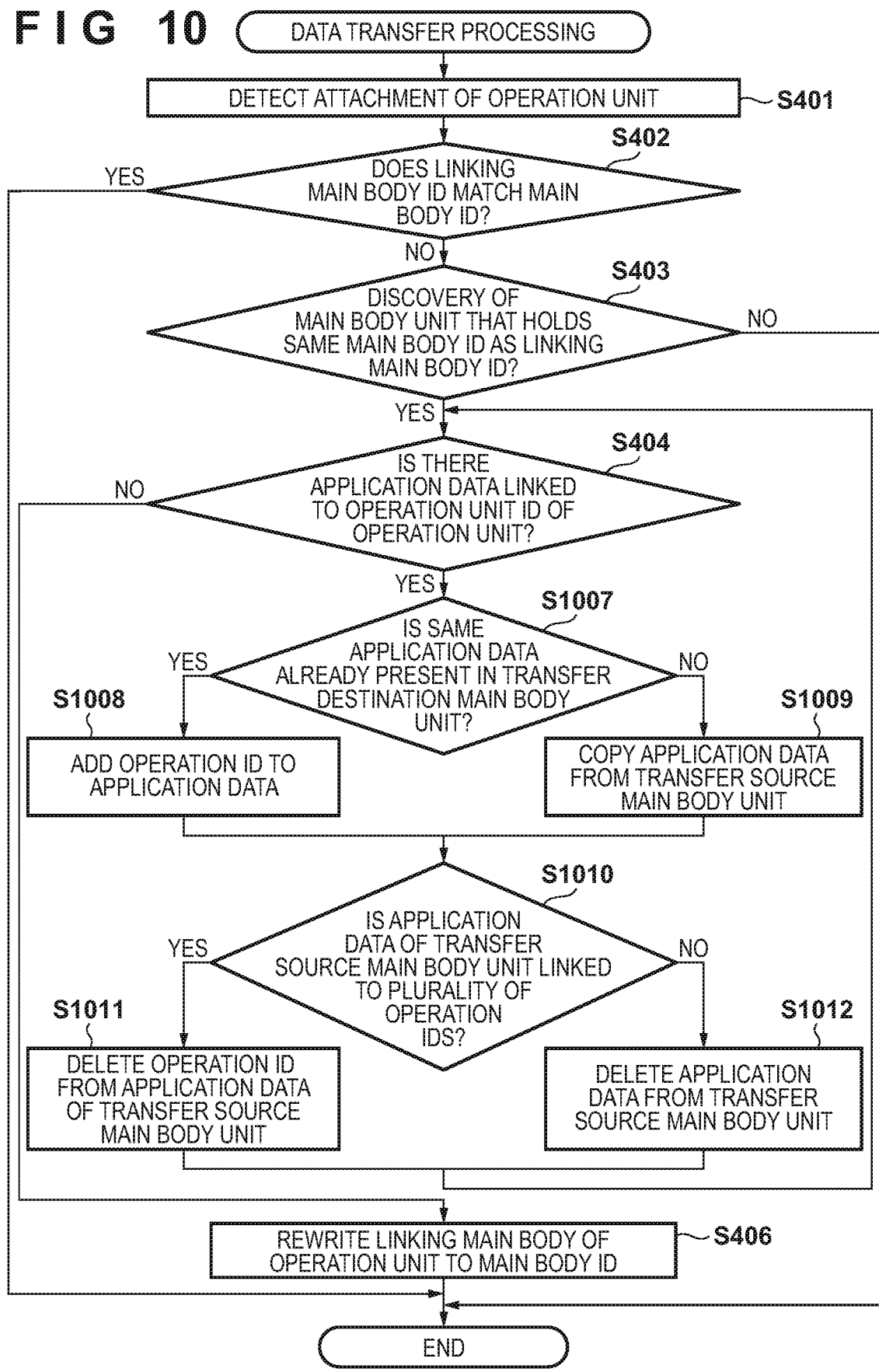
FIG. 10 is a flowchart illustrating an example of the procedure of data transfer processing.

The sixth embodiment of the present invention will be described hereinafter. Although all of the application data 305 to be used by the applications 302 are transferred in the first embodiment, the data is not transferred in a case in which the same data as the data which is to be transferred is already present in the transfer destination main body unit in the sixth embodiment. Note that the processes other than the data transfer processing are the same as those described above in the first embodiment, and thus a description will be omitted. In this embodiment, application data 305 can be linked to a plurality of operation unit IDs 303. In this embodiment, an example of the procedure of processing to transfer data from a given main body unit to another main body unit will be described with reference to the flowchart of FIG. 10. The processing procedure of steps S401 to S404 and S406 of FIG. 10 is the same as that in the first embodiment.

If it is determined in step S404 that the application data 305 is present, a data management function 205 determines whether the same data (note that the operation unit ID 303 may be different) as the corresponding application data 305 is present in the transfer destination main body unit (step S1007). If the same data is present, the process advances to step S1008. Otherwise, the process advances to step S1009. In this case, the same data is data that includes the same contents and does not change when a user uses an application 302. Note that there is no problem in the application data 305 itself being generated or deleted. For example, in a case in which identification information is added to each application data 305, the same identification information indicates the same contents, and the application data 305 will hold predetermined identification information, the application data 305 can be arranged so that it can be determined that the application data will remain unchanged even when it is used by the application 302. If the application data is arranged in this manner, the determination of step S1007 can be implemented based on the identification information of the application data 305. The sameness determination may also be performed by directly comparing the contents of the data.

In step S1007, if the same application data 305 is present in the transfer destination main body unit, the data management function 205 adds, to the already present link in the corresponding application data 305 of the transfer destination main body unit, the operation unit ID 303 of an operation unit 100 connected to the transfer destination main body unit (step S1008). The process subsequently advances to step S1010.

In step S1007, if the same application data 305 is absent in the transfer destination main body unit, the data management function 205 copies the application data 305, which was determined to be present in step S404, from the transfer source main body unit to the transfer destination main body unit (step S1009). This process is the same as that of step S605. The process subsequently advances to step S1010.

The data management function 205 determines whether the application data 305 of the transfer source main body unit which was determined to be present in step S404 is linked to a plurality of operation unit IDs 303 (step S1010). If the application data is linked to the plurality of operation unit IDs, the process advances to step S1011. Otherwise, the process advances to step S1012.

In step S1010, in a case in which the application data 305 of the transfer source main body unit, which was determined to be present in step S404, is linked to the plurality of operation unit IDs 303, the link to the operation unit ID 303 of the operation unit 100 connected to the transfer destination main body unit is canceled from the application data 305 (step S1011). For example, the operation unit ID 303 of the operation unit 100 connected to the transfer destination main body unit is deleted from the application data. Subsequently, the process returns to step S404, and processing is executed for the next application data 305.

In step S1010, in a case in which the corresponding application data 305 is not linked to the plurality of operation unit IDs 303, the application data 305 is deleted (step S1012). Subsequently, the process returns to step S404, and processing is executed for the next application data 305.

By executing the processing described in FIG. 10 in the above manner, the transfer processing can be simplified in a case in which the same data as the application data 305 in the transfer source main body unit is present in the transfer destination main body unit. In addition, the data transferred from the transfer source main body unit can be deleted. However, in a case in which a plurality of the operation units 100 are linked to the transfer target application data, the link between the transfer target application data, stored in the transfer source main body unit, and the operation unit 100, whose connection to the transfer source main body unit has been canceled and which has been newly connected to the transfer destination main body unit, is canceled. In this case, the application data is not deleted since association with the other operation units 100 remains.

Note that in step S1007, the same data is data whose contents are the same at that point, and may be data that subsequently will change. However, in this case, the data will be copied when the data is to be changed, the operation unit ID 303 will be linked to the changed data, and the link to the operation unit ID 303 will be deleted from the source data.

By performing the processing in accordance with the arrangement described above, the time required for the transfer processing can be reduced by reducing the transfer amount when the same application data 305 is present in the transfer destination, and the capacity used by the main body unit 110 can be decreased by holding only one application data 305 to prevent the overlap of application data.

In addition, even if the transfer processing is to be performed again, since the application data 305 that has been used by the plurality of operation units 100 is linked to the plurality of operation unit IDs 303, transfer from the main body unit 110 can be executed without deleting the application data by canceling only the link to the operation unit ID 303 of the application data 305.

Note that this embodiment may be applied to a mode in which the data is copied in the data transfer processing as in the second embodiment, applied to a mode in which the data is converted in the data transfer processing as in the third embodiment, or applied to a mode in which main body data 306 is also transferred as in the fourth and fifth embodiments. Furthermore, this embodiment can also have an arrangement in which user authentication is performed by using the main body data before the transfer processing as that in the fifth embodiment.

Other Embodiments

In the above-described embodiments, it was set so that the sameness of the application data could be determined by, for example, the correspondence with (for example, the identification information of the application to be used or the like) the application 302. However, since it is possible that the application data 305 may be updated, the version information and the update date may be held in the application data 305, and the sameness of these pieces of information may also be determined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195378, filed Oct. 5, 2017, which is hereby incorporated by reference herein in its entirety.

What is claimed is:

1. An information processing apparatus comprising:
an operation unit having a processor and a memory that stores at least one application and at least one program other than the application; and
a main body unit having a processor and a memory that stores application data corresponding to the at least one application, and stores at least one program,
wherein the operation unit and the main body unit can be connected to or separated from each other, and wherein the program stored in the memory of the operation unit and the program stored in the memory of the main body unit respectively cause the operation unit and the main body unit to operate as follows:
the main body unit holds first main body information that identifies the main body unit and application data linked to first operation unit information that identifies what operation unit is allowed to use the application; and
the operation unit holds second operation unit information that identifies the operation unit and second main body information that identifies the main body unit that has been connected to the operation unit, and
wherein the main body unit
determines whether the first main body information that is held by the main body unit and identifies the main body unit matches the second main body information that is held by the operation unit and identifies the main body unit that has been connected to the operation unit, after detecting that an operation unit is connected,
searches for an information processing apparatus identified by the second main body information held by the operation unit which is detected to be connected to the main body unit, in a case where it is determined that the first main body information that is held by the main body unit and identifies the main body unit does not match the second main body information that is held by the operation unit and identifies the main body unit that has been connected to the operation unit,
does not search for an information processing apparatus, in a case where it is determined that the first main body information that is held by the main body unit and identifies the main body unit matches the second main body information that is held by the operation unit and identifies the main body unit that has been connected to the operation unit, and
receives application data which is stored by the information processing apparatus found by the search and associated with the first operation unit information which matches the second operation unit information held by the operation unit that is detected to be connected to the main body unit, and wherein
the operation unit
rewrites the second main body information held by the operation unit with the first main body information identifying the main body unit connected to the operation unit, in a case where it is determined that the first main body information that is held by the main body unit and identifies the main body unit does not match the second main body information that is held by the operation unit and identifies the main body unit that has been connected to the operation unit,
requests application data corresponding to the application from the main body unit connected to the operation unit,
obtains the application data from the main body unit connected to the operation unit, in a case where it is determined that the first main body information that is held by the main body unit and identifies the main body unit matches the second main body information that is held by the operation unit and identifies the main body unit that has been connected to the operation unit, and
performs the application using the obtained application data.

2. The apparatus according to claim 1, wherein in a case in which the main body unit stores the same application data as the main body unit which is found by the search, the main body unit does not further obtain the application data from the found main body unit.

3. The apparatus according to claim 2, wherein the main body unit further makes a deletion prohibition setting to the application data which is linked to the first operation unit information and is stored in the main body unit, and cancels the deletion prohibition setting of the application data which is linked to the first operation unit information and is stored in the main body unit found by the search.

4. The apparatus according to claim 2, wherein in a case in which the main body unit stores the same application data as the main body unit found by the search, the main body unit further holds the first operation unit information identifying the first operation unit connected to the main body unit without obtaining the application data from the main body unit found by the search to associate the main body unit with the connected operation unit.

5. The apparatus according to claim 4, wherein in a case in which the application stored in the main body unit found by the search holds the first operation unit information identifying a plurality of main body units, the main body unit further deletes the first operation unit information identifying the operation unit connected to the main body unit from the first operation unit information held by the main body unit found by the search, and in a case in which the main body unit holds the first operation unit information identifying one main body unit, the main body unit deletes the application data stored in the main body unit found by the search.

6. The apparatus according to claim 1, wherein in a case in which the application data is to be obtained from the main body unit found by the search, the main body unit further determines whether conversion of the application data is required, and converts data which obtained the application data from the main body unit found by the search if the conversion is required.

7. The apparatus according to claim 1, wherein the main body unit further stores data which is other than the application data and is linked to the operation unit, and the main body unit further obtains data which is other than the application data in a case in which the data which is other than the application data and is linked to the operation unit connected to the main body unit is stored in the main body unit found by the search.

8. The apparatus according to claim 7, wherein the data other than the application data includes user data for user authentication, and in a case in which the data which is other than the application data and is linked to the operation unit connected to the main body unit is stored in the main body unit found by the search, the main body unit further executes user authentication by using the user data included in the data other than the application data, and obtains and stores, if the user authentication has succeeded, the application data and the data other than the application data stored in the main body unit found by the search.

9. The apparatus according to claim 1, wherein the operation unit further includes a user interface unit, and the main body unit further includes a scanner unit and a printer unit.

10. A method of transferring data by an information processing apparatus that includes an operation unit in which at least one application is installed, and a main body unit having a storage to store application data corresponding to the at least one application, wherein the operation unit and the main body unit can be connected to or separated from each other, wherein the main body unit holds first main body information that identifies the main body unit and application data linked to first operation unit information that identifies what operation unit is allowed to use the application; and the operation unit holds second operation unit information that identifies the operation unit and second main body information that identifies the main body unit that has been connected to the operation unit, the method comprising:

in the main body unit determining whether the first main body information that is held by the main body unit and identifies the main body unit matches the second main body information that is held by the operation unit and identifies the main body unit that has been connected to the operation unit, after detecting that an operation unit is connected, searching for an information processing apparatus identified by the second main body information held by the operation unit which is detected to be connected to the main body unit, in a case where it is determined that the first main body information that is held by the main body unit and identifies the main body unit does not match the second main body information that is held by the operation unit and identifies the main body unit that has been connected to the operation unit, not searching for an information processing apparatus, in a case where it is determined that the first main body information that is held by the main body unit and identifies the main body unit matches the second main body information that is held by the operation unit and identifies the main body unit that has been connected to the operation unit, and receiving application data which is stored by the information processing apparatus found by the search and associated with the first operation unit information which matches the second operation unit information held by the operation unit that is detected to be connected to the main body unit, and in the operation unit rewriting the second main body information held by the operation unit with the first main body information identifying the main body unit connected to the operation unit, in a case where it is determined that the first main body information that is held by the main body unit and identifies the main body unit does not match the second main body information that is held by the operation unit and identifies the main body unit that has been connected to the operation unit, requesting application data corresponding to the application from the main body unit connected to the operation unit, obtaining the application data from the main body unit connected to the operation unit, in a case where it is determined that the first main body information that is held by the main body unit and identifies the main body unit matches the second main body information that is held by the operation unit and identifies the main body unit that has been connected to the operation unit, and performing the application using the obtained application data.

* * * * *